(12) United States Patent
Henky et al.

(10) Patent No.: US 9,435,914 B2
(45) Date of Patent: Sep. 6, 2016

(54) OPTICAL ARTICLE COMPRISING A PRECURSOR COATING FOR AN ANTIFOGGING COATING AND A TEMPORARY LAYER RENDERING SAME SUITABLE FOR EDGING

(75) Inventors: Francis Henky, Charenton le Pont (FR); Alexis Theoden, Charenton le Pont (FR)

(73) Assignee: ESSILOR INTERNATIONAL, Charenton le Pont (FR)

( * ) Notice: Subject to any disclaimer, the term of this patent is extended or adjusted under 35 U.S.C. 154(b) by 283 days.

(21) Appl. No.: 14/117,251

(22) PCT Filed: May 11, 2012

(86) PCT No.: PCT/FR2012/051044
§ 371 (c)(1),
(2), (4) Date: Nov. 12, 2013

(87) PCT Pub. No.: WO2012/153072
PCT Pub. Date: Nov. 15, 2012

(65) Prior Publication Data
US 2015/0062704 A1    Mar. 5, 2015

(30) Foreign Application Priority Data

May 12, 2011   (FR) ..................... 11 54128

(51) Int. Cl.
G02B 1/10    (2015.01)
G02B 27/00    (2006.01)
G02C 7/02    (2006.01)
G02B 1/115    (2015.01)

(52) U.S. Cl.
CPC ............ *G02B 1/10* (2013.01); *G02B 27/0006* (2013.01); *G02C 7/02* (2013.01); *G02B 1/105* (2013.01); *G02B 1/115* (2013.01); *Y10T 29/49826* (2015.01)

(58) Field of Classification Search
CPC .... G02B 1/10; G02B 27/00; G02B 27/0006; G02B 1/105; G02B 1/115; G02B 7/1815; G02C 7/02; Y10T 29/49826; A47G 1/02; H05B 3/845; B60R 1/0602
See application file for complete search history.

(56) References Cited

U.S. PATENT DOCUMENTS

| 8,709,588 B2 | 4/2014 | Cadet et al. ............... 428/304.4 |
| 2012/0019767 A1* | 1/2012 | Cadet ..................... C03C 17/30 351/62 |
| 2014/0125945 A1* | 5/2014 | West ..................... G02B 1/105 351/159.57 |
| 2014/0177053 A1* | 6/2014 | Cadet ..................... G02B 1/115 359/507 |
| 2015/0277152 A1* | 10/2015 | Igier ...................... C03C 17/42 351/159.01 |

FOREIGN PATENT DOCUMENTS

| EP | 1 392 613 | 8/2005 |
| EP | 1633684 | 1/2014 |
| FR | 2 860 306 | 4/2005 |
| FR | 2 907 915 | 5/2008 |
| FR | 2 921 161 | 3/2009 |
| FR | 2 924 233 | 5/2009 |
| JP | 2004317539 | 11/2004 |
| WO | WO 02/092524 | 11/2002 |
| WO | WO 03/057641 | 7/2003 |
| WO | WO 2005/015270 | 2/2005 |
| WO | WO 2010/055261 | 5/2010 |

OTHER PUBLICATIONS

International Search Report issued in PCT/FR2012/051044, mailed Aug. 30, 2012.

* cited by examiner

*Primary Examiner* — Jennifer L. Doak
(74) *Attorney, Agent, or Firm* — Norton Rose Fulbright US LLP

(57) ABSTRACT

The present invention concerns an optical article comprising a substrate, at least one of the main surfaces of which is coated with a first coating comprising, at its surface, silanol groups and, in direct contact with this coating, a second coating which is a precursor for an antifog coating, the second coating being formed by deposition, on the first coating, of at least one compound A having a polyoxyalkylene group, and at least one group capable of establishing a covalent bond with a silanol group, wherein the second coating comprises an internal part, in which compound A is grafted to the first coating, and an external part, which can be removed by washing and/or wiping, resulting from the deposition of the compound A, and wherein the second coating is coated with at least one temporary layer comprising at least 50% by weight of silica.

20 Claims, No Drawings

OPTICAL ARTICLE COMPRISING A PRECURSOR COATING FOR AN ANTIFOGGING COATING AND A TEMPORARY LAYER RENDERING SAME SUITABLE FOR EDGING

CROSS-REFERENCE TO RELATED APPLICATIONS

This application is a national phase application under 35 U.S.C. §371 of International Application No. PCT/FR2012/051044 filed 11 May 2012, which claims priority to French Application No. 1154128 filed 12 May 2011. The entire contents of each of the above-referenced disclosures is specifically incorporated herein by reference without disclaimer.

The present invention is concerned with the edging or sizing of an optical article, more particularly an ophthalmic lens, coated with a coating comprising, at its surface, silanol groups, the surface of which has been modified in order to make possible effective and lasting application of a temporary antifog solution. The present invention relates to such an article having been made suitable for edging, to a preparation process and to a process for edging this article.

Numerous supports, such as plastics and glass, exhibit the disadvantage of becoming covered with fogging when the temperature of their surface falls below the dew point of the ambient air. This is the case in particular with glass, which is used to form windows for transportation vehicles or buildings, mirrors, ophthalmic lenses, such as spectacle lenses, and the like. The formation of fogging on these surfaces leads to a decrease in the transparency, due to the scattering of light by the water drops, which can cause significant nuisance.

In order to prevent the formation of fogging in a very humid environment, that is to say the condensation of minute water droplets on a support, it is possible to deposit, on the external surface of this support, hydrophilic coatings having a low static contact angle with water (typically 10° or less). These permanent antifog coatings, the hydrophilic properties of which result from hydrophilic compounds permanently bonded to another coating or support, act as sponges with regard to the fogging and make it possible for the water droplets to adhere to the surface of the support by forming a very thin film which gives a feeling of transparency. These coatings, as a result of the absorption of water, expand, soften and become mechanically weaker.

Another solution, which makes it possible to combine antireflective and antifog properties, consists in using a thin porous layer having a low refractive index, partially composed of surfactants, which allow the layer to acquire permanent antifog properties.

Antifog properties can also be obtained by applying commercial temporary solutions, available in the spray or wipe form, to spectacle lenses comprising, as external layer, a (hydrophobic and oleophobic) dirt-repellent coating. They make it possible to obtain the antifog property over a short period of time as, after a few wiping actions, these hydrophilic materials are removed.

A more advantageous solution consists in obtaining an antifog coating by application of a temporary hydrophilic solution to the surface of a precursor coating for an antifog coating, which represents an alternative to permanent antifog coatings.

A description has been given, in French patent application No. 10.53269, of the deposition, on the external surface of an optical article coated with a coating comprising, at its surface, silanol groups, of a precursor hydrophilic coating for an antifog coating obtained by grafting an organosilane compound having a polyoxyalkylene group and at least one silicon atom carrying at least one hydrolyzable group. The antifog coating itself, which is a temporary coating, is obtained after application, at the surface of the precursor coating, of a surfactant. The precursor coating for the antifog coating typically has a thickness of less than or equal to 5 nm. This final thickness can be obtained by directly depositing the appropriate amount of organosilane compound.

However, the inventors have found that it is preferable to form the precursor coating for the antifog coating by depositing an excess of organosilane compound at the surface of the coating comprising silanol groups and by removing the excess of this compound, deposited but not grafted, so as to arrive at the same final thickness. The inventors have found that, when a layer of grafted organosilane compound having a thickness which does not require removal of an excess of organosilane compound is formed directly, it is possible, in some cases, to obtain an uneven deposited layer and a precursor coating for the antifog coating, the surface of which does not have a sufficient affinity toward a surfactant liquid solution, which results in a coating not having the desired antifog properties, generally less durable. Such reproducibility problems absolutely have to be avoided in order for the production process to be able to be operated industrially.

The final stage of finishing an optical article, such as an ophthalmic lens, is the operation of edging or trimming, which consists in machining the slice or the periphery of the lens so as to shape it to the dimensions required to fit the lens to the spectacle frame in which it is intended to be emplaced.

The edging is generally carried out on a grinder comprising diamond wheels which carry out the machining as defined above. The lens is held, during this operation, by axially acting clamping devices. The relative movement of the lens, with respect to the wheel, is controlled, generally digitally, in order to produce the desired shape. As is apparent, it is quite essential for the lens to be firmly held during this movement.

For this, before the edging operation, a blocking operation is carried out on the lens, that is to say that a holding means or block will be positioned on the convex surface of the lens. Typically, a holding pad (or fixing pad), such as a self-adhesive disk, for example a double-sided adhesive pad, is positioned between the block and the convex surface of the lens. The block to which the lens adheres via the adhesive pad is then mechanically fixed in the mounting axis of the grinder and an axial arm will lock the lens by applying a central force to the face of the lens opposite the block. During the machining, a tangential torque stress is generated on the lens, which can bring about rotation of the lens with respect to the block if the system for holding the lens is not effective enough. Whether the lens is held well depends mainly on whether there is good adhesion at the holding pad/convex surface of the lens interface.

The optical articles comprising a hydrophobic and/or oleophobic dirt-repellent external layer, typically based on materials of fluorosilane type, which exhibit a low surface energy (typically less than 14 mJ/m$^2$ and generally less than or equal to 12 mJ/m$^2$), cannot be edged directly as the adhesion at the pad/convex surface interface is found to be detrimentally affected thereby, which makes satisfactory edging operations difficult.

The surface energies are measured according to the Owens-Wendt method (Estimation of the surface force energy of polymers, Owens D. K. and Wendt R. G., (1969), J. Appl. Polym. Sci., 13, 1741-1747).

During the edging, the lens must not undergo an offset of greater than 2°, preferably at most 1°, and consequently the adhesion of the pad to the surface of the lens is essential in order to obtain satisfactory edging. The consequence of slipping of the lens during a badly managed edging operation is the pure and simple loss of the lens.

In order to overcome these difficulties of edging of the lenses provided with a hydrophobic and/or oleophobic external coating, provision has been made to form a temporary coating, of organic or inorganic nature, on these coatings, in particular a temporary layer of $MgF_2$, peelable coatings of polymeric nature or temporary adhesive films of polymeric nature. These temporary layers are described in particular in the applications EP 1 392 613, EP 1 633 684, WO 2005/015270, WO 03/057641, JP 2004-122238 and WO 03/092957.

The inventors have found that it is difficult to edge an optical article comprising, as external layer, an antifog coating precursor deposited in excess, that is to say the thickness of which is greater than that of a grafted layer, although this layer has a high surface energy. Such a layer does not make possible good behaviour of the pad and results in slipping of the article during the edging operation.

The objective of the present invention is the preparation of an optical article, comprising a precursor coating for an antifog coating, with a thickness preferably of greater than 3 nm, which is suitable for edging.

The invention is also targeted at the development of a process for edging optical articles coated with a precursor coating for an antifog coating which is reliable and guarantees a very high degree of success for the edging operation, making it possible to avoid any problem of slipping of the lens during the edging operation in question.

At the beginning of the invention, the inventors have demonstrated that the problem found during the edging of the abovementioned optical articles comes in fact from the deposition of an excess of antifog coating precursor. It might be thought that this problem can be solved by completely removing the excess of precursor compound for the antifog coating deposited before carrying out the edging. However, this solution is not satisfactory industrially as the removal operation would require thorough cleaning of the surface of the optical article for the edging to be able to be correctly carried out, which is technically complex. The use of adhesive films (called stickers when they are films small in size, greater than the size of the adhesive pad and less than the diameter of the lens) positioned between the hydrophilic layer and the adhesive pad in order to improve the behaviour of said pad is not itself satisfactory either. This results in an additional cost for the optician and in handling problems for the optician as the deposition of a sticker without forming a fold at its surface is a delicate operation.

The objectives of the invention are achieved by virtue of the use of a temporary layer, the composition of which has been specially designed to solve the problem posed, which is inserted between the precursor coating for the antifog coating deposited in excess and the fixing device, and which has to be removed after the edging operation.

Thus, the present invention relates to an optical article comprising a substrate, at least one of the main surfaces of which is coated with a first coating comprising, at its surface, silanol groups and, in direct contact with this coating, a second coating which is a precursor for an antifog coating, the second coating, which is a precursor of the antifog coating, being formed by deposition, on the first coating comprising, at its surface, silanol groups, of at least one compound A having:
 a polyoxyalkylene group, and
 at least one group capable of establishing a covalent bond with a silanol group,
where the second coating, which is a precursor of the antifog coating, comprises an internal part, in which said compound A is grafted to the coating comprising, at its surface, silanol groups, and an external part, which can be removed by washing and/or wiping, resulting from the deposition of the compound A, the second coating, which is a precursor of the antifog coating, being coated with at least one temporary layer comprising at least 50%, preferably at least 60% and better still at least 70% by weight of silica, with respect to the total weight of the temporary layer.

The invention also relates to a process for manufacturing and to a process for edging such an article.

In the present patent application, a coating which is "on" a substrate/coating or which has been deposited "on" a substrate/coating is defined as a coating which (i) is positioned above the substrate/coating, (ii) is not necessarily in contact with the substrate/coating, that is to say that one or more intermediate coatings may be positioned between the substrate/coating and the coating in question (however, it is preferably in contact with said substrate/coating), and (iii) does not necessarily completely cover the substrate/coating. When "a layer 1 is located under a layer 2", it will be understood that the layer 2 is further from the substrate than the layer 1. Likewise, an "external" layer is further from the substrate than an "internal" layer.

The term "antifog coating" is understood to mean, in the present patent application, a coating which, when a transparent glass substrate coated with this coating is placed under conditions which bring about fogging on said substrate not equipped with said coating, immediately makes possible a visual acuity>$6/10^{th}$ for an observer observing, through the coated glass, a visual acuity scale located at a distance of 5 meters. A test which makes it possible to evaluate the antifog properties of a coating is described in the experimental part. Under conditions which bring about fogging, the antifog coatings may either not exhibit fogging at their surface (no visual distortion in the ideal case or else visual distortion but visual acuity>$6/10^{th}$ under the measurement conditions indicated above) or may exhibit fogging at their surface but still may make possible, despite the disturbance to vision caused by the fogging, a visual acuity>$6/10^{th}$ under the measurement conditions indicated above. A non-antifog coating does not make possible a visual acuity>$6/10^{th}$ while it is exposed to conditions bringing about fogging and generally exhibits a condensation veil under the measurement conditions indicated above.

The term "antifog glass" is understood to mean, in the present patent application, a glass equipped with an "antifog coating" as defined above.

Thus, the precursor for the antifog coating according to the invention, which is a hydrophilic coating, is not regarded as being an antifog coating within the meaning of the invention. In fact, this precursor for the antifog coating does not make possible a visual acuity>$6/10^{th}$ under the measurement conditions indicated above.

The term "temporary antifog coating" is understood to mean an antifog coating obtained after the application of a liquid solution comprising at least one surfactant at the surface of a precursor coating for said antifog coating. The durability of a temporary antifog coating is generally limited by actions in which its surface is wiped, the surfactant molecules not being permanently attached to the surface of the coating, but simply adsorbed in a more or less lasting fashion.

The optical article prepared according to the invention comprises a substrate, preferably a transparent substrate, having front and back main faces, at least one of said main faces comprising a coating comprising, at its surface, silanol groups, preferably both main faces. The term "back face" (generally concave) of the substrate is understood to mean the face which, when the article is used, is closer to the eye of the wearer. Conversely, the term "front face" (generally convex) of the substrate is understood to mean the face which, when the article is used, is further from the eye of the wearer.

Although the article according to the invention can be any optical article capable of being confronted with the formation of fogging, such as a screen, a window for the motor vehicle industry or the construction industry, or a mirror, it is preferably an optical lens, better still an ophthalmic lens, for spectacles, or an optical or ophthalmic lens blank.

This excludes articles, such as intraocular lenses in contact with living tissues or contact lenses, which are not intrinsically confronted with the problem of the formation of fogging, in contrast to spectacle lenses.

The coating comprising, at its surface, silanol groups of the invention can be formed on at least one of the main faces of a bare substrate, that is to say an uncoated substrate, or on at least one of the main faces of a substrate already coated with one or more functional coatings.

The substrate of the optical article according to the invention can be a mineral or organic glass, for example an organic glass made of thermoplastic or thermosetting plastic.

Classes of substrates which are particularly preferred are poly(thiourethanes), polyepisulfides and the resins resulting from the polymerization or (co)polymerization of alkylene glycol bis(allyl carbonate)s. The latter are sold, for example, under the trade name CR-39® by PPG Industries (Orma® lenses, Essilor).

In some applications, it is preferable for the main surface of the substrate to be coated with one or more functional coatings prior to the deposition of the coating comprising, at its surface, silanol groups. These functional coatings conventionally used in optics can, without limitation, be a layer of impact-resistant primer, an abrasion-resistant and/or scratch-resistant coating, a polarized coating, a photochromic coating or a colored coating, in particular a layer of impact-resistant primer coated with an abrasion-resistant and/or scratch-resistant layer.

The coating comprising, at its surface, silanol groups can be deposited on an abrasion-resistant and/or scratch-resistant coating. The abrasion-resistant and/or scratch-resistant coating can be any layer conventionally used as abrasion-resistant and/or scratch-resistant coating in the field of ophthalmic lenses.

The coatings resistant to abrasion and/or to scratches are preferably hard coatings based on poly(meth)acrylates or on silanes generally comprising one or more inorganic fillers intended to increase the hardness and/or the refractive index of the coating once cured. The term "(meth)acrylate" is understood to mean an acrylate or a methacrylate.

Mention may be made, among the coatings recommended in the present invention, of coatings based on epoxysilane hydrolyzates, such as those described in the patents EP 0 614 957, U.S. Pat. No. 4,211,823 and U.S. Pat. No. 5,015,523.

The thickness of the abrasion-resistant and/or scratch-resistant coating generally varies from 2 to 10 µm, preferably from 3 to 5 µm.

It is possible, prior to the deposition of the abrasion-resistant and/or scratch-resistant coating, to deposit, on the substrate, a primer coating which improves the impact strength and/or the adhesion of the subsequent layers in the final product.

This coating can be any impact-resistant primer layer conventionally used for articles made of transparent polymeric material, such as ophthalmic lenses.

Mention may be made, among preferred primer compositions, of compositions based on thermoplastic polyurethanes, such as those described in the patents JP 63-141001 and JP 63-87223, poly(meth)acrylic primer compositions, such as those described in the patent U.S. Pat. No. 5,015,523, compositions based on thermosetting polyurethanes, such as those described in the patent EP 0 404 111, and compositions based on poly(meth)acrylic latexes or on latexes of polyurethane type, such as those described in the patents U.S. Pat. No. 5,316,791 and EP 0 680 492.

The primer layers generally have thicknesses, after curing, of 0.2 to 2.5 µm and preferably of 0.5 to 1.5 µm.

The coating comprising, at its surface, silanol groups will now be described. The term "coating comprising, at its surface, silanol groups" is understood to mean a coating which naturally has, at its surface, silanol groups or else a coating, the silanol groups of which have been created after it has been subjected to a surface activation treatment. This coating is thus a coating based on siloxanes or on silica, for example, without limitation, a silica layer, a sol-gel coating, based in particular on organosilanes, such as alkoxysilanes, or a coating based on silica colloids. It can in particular be an abrasion-resistant and/or scratch-resistant coating or, according to the preferred embodiment, a monolayer antireflective coating or a multilayer antireflective coating, the external layer of which has, at its surface, silanol groups. The term "external layer of a stack" is understood to mean the layer furthest from the substrate.

The surface activation treatment optionally employed to create silanol groups or at least to increase their proportion at the surface of a coating is generally carried out under vacuum. It can be a bombardment with energetic and/or reactive species, for example an ion beam (Ion Pre-Cleaning or IPC) or an electron beam, a corona discharge treatment, an ion spallation, a UV treatment or a vacuum plasma treatment. It can also be an acidic or basic surface treatment and/or a treatment with solvents. Several of these treatments can be combined.

The term "energetic species" (and/or "reactive species") is understood to mean in particular ionic species having an energy ranging from 1 to 300 eV, preferably from 1 to 150 eV, better still from 10 to 150 eV and even better still from 40 to 150 eV. The energetic species can be chemical species, such as ions or radicals, or species such as photons or electrons.

The coating comprising, at its surface, silanol groups is preferably a layer with a low refractive index based on silica (comprising silica) and ideally consists of a layer of silica ($SiO_2$), generally obtained by vapor phase deposition. Said silica-based layer preferably has a thickness of less than or equal to 500 nm, better still from 2 to 110 nm and preferentially varying from 5 to 100 nm.

The coating comprising, at its surface, silanol groups preferably comprises at least 70% by weight of $SiO_2$, better still at least 80% by weight of $SiO_2$ and even better still at least 90% by weight of SiO$_2$. As has been said, in an optimum implementation, it comprises 100% by weight of silica.

The coating comprising, at its surface, silanol groups can also be a sol-gel coating based on silanes, such as alkoxysilanes, for example tetraethoxysilane, or organosilanes, such as γ-glycidoxypropyltrimethoxysilane. Such a coating is obtained by deposition by the liquid route, using a liquid composition comprising a silane hydrolyzate and optionally colloidal materials with a high (>1.55, preferably >1.60, better still >1.70) or low 1.55) refractive index. Such a coating, the layers of which comprise a hybrid organic/inorganic matrix based on silanes, in which matrix are dispersed colloidal materials making it possible to adjust the refractive index of each layer, is described, for example, in the patent FR 2 858 420.

According to one embodiment of the invention, the coating comprising, at its surface, silanol groups is a silica-based layer deposited on an abrasion-resistant coating, preferably deposited directly on this abrasion-resistant coating.

According to another embodiment of the invention, which constitutes the preferred embodiment, the optical article according to the invention comprises an antireflective coating. When such a coating is present, it generally constitutes the coating comprising, at its surface, silanol groups within the meaning of the invention. This antireflective coating can be any antireflective coating conventionally used in the optical field, in particular the field of ophthalmic optics, provided that it comprises, at its surface, silanol groups.

An antireflective coating is defined as a coating, deposited at the surface of an optical article, which improves the antireflective properties of the final optical article. It makes it possible to reduce the reflection of light at the article/air interface over a relatively broad portion of the visible spectrum.

As is also well known, antireflective coatings conventionally comprise a monolayer or multilayer stack of dielectric materials. These are preferably multilayer coatings, comprising layers with a high refractive index (HI) and layers with a low refractive index (LI).

In the present patent application, a layer of the antireflective coating is said to be a layer with a high refractive index when its refractive index is greater than 1.55, preferably greater than or equal to 1.6, better still greater than or equal to 1.8 and even better still greater than or equal to 2.0. A layer of an antireflective coating is said to be a layer with a low refractive index when its refractive index is less than or equal to 1.55, preferably less than or equal to 1.50 and better still less than or equal to 1.45. Unless otherwise indicated, the refractive indices to which reference is made in the present invention are expressed at 25° C. for a wavelength of 550 nm.

The HI and LI layers are respectively conventional layers with a high refractive index and with a low refractive index well known in the art, the composition, the thickness and the method of deposition of which are described in particular in the application WO 2010/109154.

Preferably, the total thickness of the antireflective coating is less than 1 micrometer, better still less than or equal to 800 nm and even better still less than or equal to 500 nm. The total thickness of the antireflective coating is generally greater than 100 nm, preferably greater than 150 nm.

Before the formation of the precursor for the antifog coating on the coating comprising, at its surface, silanol groups, it is normal to subject the surface of this coating to a physical or chemical activation treatment intended to increase the adhesion of the precursor for the antifog coating. These treatments can be chosen from those described above for the activation of the coating comprising, at its surface, silanol groups.

According to the invention, the coating comprising, at its surface, silanol groups is directly in contact with the precursor coating for the antifog coating, which will now be described.

The term "precursor for an antifog coating" is understood to mean, in the present patent application, a coating which, by application, at its surface, of a liquid solution comprising a surfactant, so as to form a film, constitutes an antifog coating within the meaning of the invention. The combination formed by the precursor coating and the film of solution based on surfactant constitutes the antifog coating proper.

The precursor coating for the antifog coating is formed by deposition in a sufficient amount, on the coating comprising, at its surface, silanol groups, of at least one compound A having a polyoxyalkylene group and at least one group capable of establishing a covalent bond with a silanol group. According to the invention, the deposition of the compound A forms a precursor coating for an antifog coating comprising an internal part, in which said compound A is permanently (and not by simple adsorption) grafted to the coating comprising, at its surface, silanol groups, and an external part which can be removed by washing and/or wiping.

In order to arrive at such a structure, it is necessary to deposit an excess of compound A at the surface of the coating comprising silanol groups. The adjusting of the deposition parameters in order to arrive at such a configuration is within the skills of a person skilled in the art.

The term "excess" is understood to mean an amount of compound A which is greater than the amount which would be necessary in order to form a grafted layer of compound A at the surface of the coating comprising silanol groups.

Thus, the precursor coating for the antifog coating is a coating preferably having a thickness of greater than or equal to 3 nm, better still ≥5 nm, even better still ≥8 nm and ideally ≥10 nm. Its thickness is preferably less than 100 nm, better still ≤50 nm and even better still ≤20 nm. It typically ranges from 3 to 100 nm, preferably from 5 to 50 nm.

The external part of the precursor coating for the antifog coating can be removed by washing and/or wiping, which means that it would be removed by subjecting it in particular to washing with soapy water (including a surfactant), using a sponge, and then with deionized water, and/or to wiping for typically 20 seconds or less, using a CEMOI™ Wypall™ or Selvith™ cloth which is dry or optionally impregnated with alcohol, typically isopropyl alcohol. This wiping operation can optionally be followed by a further rinsing with deionized water and by a final wiping with a rag.

The compound A is capable, by virtue of its reactive group(s), of establishing a covalent bond with the silanol groups present at the surface of the coating on which it is deposited. This group can be, without limitation, an isocyanate, acrylate, methacrylate, haloalkyl, carboxylic acid, sulfonic acid, acyl chloride, chlorosulfonyl, chloroformate or ester group, a silicon atom carrying at least one hydrolyzable group or a group comprising an epoxide functional group, such as the glycidyl group, preferably a silicon atom carrying at least one hydrolyzable group.

The compound A is preferably an organosilane compound, the group(s) capable of establishing a covalent bond with a silanol group of which is (are) a silicon atom(s) carrying at least one hydrolyzable group. Its polyoxyalkylene chain is functionalized at just one end or at both its ends, preferably at just one end, by at least one, preferably just one, group comprising at least one silicon atom carrying at least one hydrolyzable group. This organosilane compound preferably comprises a silicon atom carrying at least two hydrolyzable groups, preferably three hydrolyzable groups. Preferably, it does not comprise a urethane group. It is preferably a compound of formula:

$$R^1Y_mSi(X)_{3-m} \quad (I)$$

in which the Y groups, which are identical or different, are monovalent organic groups bonded to the silicon via a carbon atom, the X groups, which are identical or different, are hydrolyzable groups or hydroxyl groups, $R^1$ is a group comprising a polyoxyalkylene functional group and m is an integer equal to 0, 1 or 2. Preferably, m=0.

The X groups are preferably chosen from alkoxy groups —O—$R^3$, in particular $C_1$-$C_4$ alkoxy groups, acyloxy groups —O—C(O)$R^4$, where $R^4$ is an alkyl radical, preferably a $C_1$-$C_6$ alkyl radical, preferably a methyl or ethyl radical, halogens, such as Cl and Br, or the trimethylsiloxy group $(CH_3)_3SiO$—, and the combinations of these groups. Preferably, the X groups are alkoxy groups, in particular methoxy or ethoxy groups and better still ethoxy groups.

The Y group, present when m is not zero, is preferably a saturated or unsaturated hydrocarbon group, preferably a $C_1$-$C_{10}$ hydrocarbon group and better still a $C_1$-$C_4$ hydrocarbon group, for example an alkyl group, such as methyl or ethyl, a vinyl group or an aryl group, for example a phenyl group, which is optionally substituted, in particular by one or more $C_1$-$C_4$ alkyl groups. Preferably, Y represents the methyl group.

According to a preferred embodiment, the compound of formula I comprises a trialkoxysilyl group, such as a triethoxysilyl or trimethoxysilyl group.

The polyoxyalkylene group of the organosilane compound ($R^1$ group) preferably comprises less than 80 carbon atoms, better still less than 60 carbon atoms and even better still less than 50 carbon atoms. The $R^1$ group preferably meets these same conditions.

The $R^1$ group generally has the formula -L-$R^2$, where L is a divalent group bonded to the silicon atom of the compounds of formula I or II via a carbon atom and $R^2$ is a group comprising a polyoxyalkylene group bonded to the L group via an oxygen atom, this oxygen atom being included in the $R^2$ group. Nonlimiting examples of L groups are linear or branched alkylene groups which are optionally substituted, cycloalkylene groups, arylene groups, the carbonyl group, the amido group or combinations of these groups, such as cycloalkylenealkylene, biscycloalkylene, biscycloalkylenealkylene, arylenealkylene, bisphenylene, bisphenylenealkylene or amidoalkylene groups, an example of which is the CONH($CH_2$)$_3$ group, or else the —OCH$_2$CH(OH)CH$_2$— and —NHC(O)— groups. The preferred L groups are alkylene groups, preferably linear alkylene groups, preferably having 10 or less carbon atoms, better still 5 or less carbon atoms, for example the ethylene and propylene groups.

The preferred $R^2$ groups comprise a polyoxyethylene group —(CH$_2$CH$_2$O)$_n$—, a polyoxypropylene group or combinations of these groups.

The preferred organosilanes of formula I are compounds of following formula II:

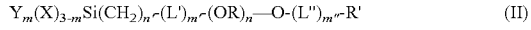
$$Y_m(X)_{3-m}Si(CH_2)_n-(L')_{m'}-(OR)_n-O-(L'')_{m''}-R' \quad (II)$$

where R' is a hydrogen atom, an acyl group or an alkyl group which is linear or branched, which is optionally substituted by one or more functional groups and which can additionally comprise one or more double bonds, R is a linear or branched alkylene group, preferably a linear alkylene group, for example an ethylene or propylene group, L' and L'' are divalent groups, X, Y and m are as defined above, n' is an integer ranging from 1 to 10, preferably from 1 to 5, n is an integer ranging from 2 to 50, preferably from 5 to 30 and better still from 5 to 15, m' is equal to 0 or 1, preferably 0, and m'' is equal to 0 or 1, preferably 0.

The L' and L'' groups, when they are present, can be chosen from the divalent groups L described above and preferably represent the —OCH$_2$CH(OH)CH$_2$— group or the —NHC(O)— group. In this case, the —OCH$_2$CH(OH)CH$_2$— or —NHC(O)— groups are connected to the adjacent groups (CH$_2$)$_{n'}$ (in the case of an L' group) and R' (in the case of an L'' group) via their oxygen atom (for the —OCH$_2$CH(OH)CH$_2$— group) or via their nitrogen atom (for the —NHC(O)— group).

The —O-(L'')$_{m''}$-R' group is preferably an alkoxy group (m''=0, R'=alkyl), ideally a methoxy group.

Preferably, the compounds of formula (I) or (II) comprise only one silicon atom carrying at least one hydrolyzable group.

According to one embodiment, m=0 and the hydrolyzable groups X denote methoxy or ethoxy groups. n' is preferably equal to 3. According to another embodiment, R' denotes an alkyl group having less than 5 carbon atoms, preferably the methyl group. R' can also denote an aliphatic or aromatic acyl group, in particular the acetyl group.

Finally, R' can denote a trialkoxysilylalkylene or trihalosilylalkylene group, such as the —(CH$_2$)$_{n''}$Si(R$^5$)$_3$ group, where $R^5$ is a hydrolyzable group, such as the X groups defined above, and n'' is an integer such as the n' group defined above. An example of such an R' group is the —(CH$_2$)$_3$Si(OC$_2$H$_5$)$_3$ group. In this embodiment, the organosilane compound comprises two silicon atoms carrying at least one hydrolyzable group.

According to preferred embodiments, n is equal to 3 or else varies from 6 to 9, from 9 to 12, from 21 to 24 or from 25 to 30, preferably from 6 to 9.

Mention may be made, as examples of compounds of formula II, of the 2-[methoxy(polyethyleneoxy)propyl]trimethoxysilane compounds of formulae CH$_3$O—(CH$_2$CH$_2$O)$_{6-9}$—(CH$_2$)$_3$Si(OCH$_3$)$_3$ (III) and CH$_3$O—(CH$_2$CH$_2$O)$_{9-12}$—(CH$_2$)$_3$Si(OCH$_3$)$_3$ (IV), sold by Gelest Inc. or ABCR, the compound of formula CH$_3$O—(CH$_2$CH$_2$O)$_3$—(CH$_2$)$_3$Si(OCH$_3$)$_3$ (VIII), the compounds of formula CH$_3$O—(CH$_2$CH$_2$O)$_n$—(CH$_2$)$_3$Si(OC$_2$H$_5$)$_3$, where n=21-24, 2-[methoxy(polyethyleneoxy)propyl]trichlorosilanes, 2-[acetoxy(polyethyleneoxy)propyl]trimethoxysilane of formula CH$_3$C(O)O—(CH$_2$CH$_2$O)$_{6-9}$—(CH$_2$)$_3$Si(OCH$_3$)$_3$, 2-[acetoxy(polyethyleneoxy)propyl]triethoxysilane of formula CH$_3$C(O)O—(CH$_2$CH$_2$O)$_{6-9}$—(CH$_2$)$_3$Si(OC$_2$H$_5$)$_3$, 2-[hydroxy(polyethyleneoxy)propyl]trimethoxysilane of formula HO—(CH$_2$CH$_2$O)$_{6-9}$—(CH$_2$)$_3$Si(OCH$_3$)$_3$, 2-[hydroxy(polyethyleneoxy)propyl]triethoxysilane of formula HO—(CH$_2$CH$_2$O)$_{6-9}$—(CH$_2$)$_3$Si(OC$_2$H$_5$)$_3$, the compounds of formulae HO—(CH$_2$CH$_2$O)$_{8-12}$—(CH$_2$)$_3$Si(OCH$_3$)$_3$ and HO—(CH$_2$CH$_2$O)$_{8-12}$—(CH$_2$)$_3$Si(OC$_2$H$_5$)$_3$, (polypropylene oxide)-bis[3-(methyldimethoxysilyl)propyl] and compounds comprising two siloxane heads, such as (polyethylene oxide)-bis[3-(triethoxysilylpropoxy)-2-hydroxypropoxy] of formula (V), (polyethylene oxide)-bis[N-(triethoxysilylpropyl)aminocarbonyl] of formula (VI) with n=10-15 and (polyethylene oxide)-bis(triethoxysilylpropyl) of formula (VII):

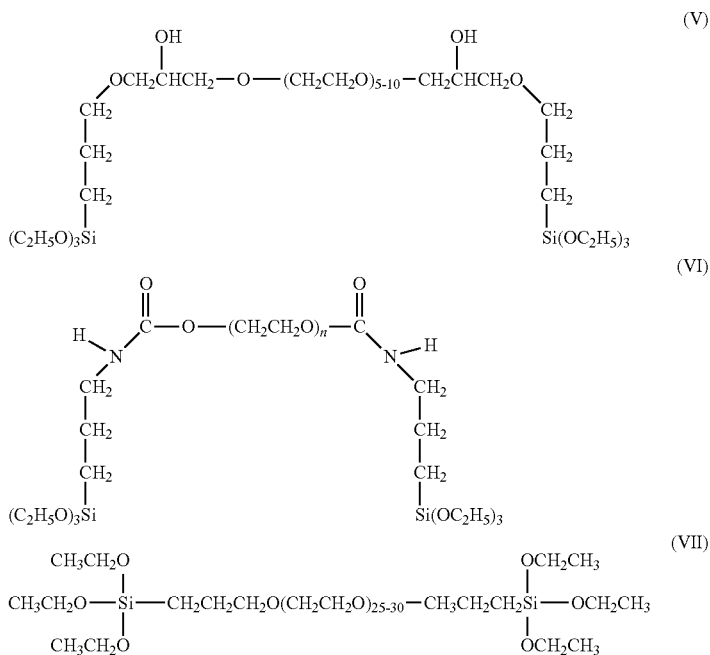

The preferred compounds of formula II are the [alkoxy(polyalkylenoxy)alkyl]trialkoxysilanes or their trihalo analogs (m=m'=m"=0, R'=alkoxy).

Preferably, the organosilane compound of the invention does not have any fluorine atom. Typically, the content by weight of fluorine in the precursor coating for the antifog coating is less than 5% by weight, preferably less than 1% by weight and better still 0% by weight.

Preferably, the molar mass of the compound A according to the invention ranges from 400 to 4000 g/mol, preferably from 400 to 1500 g/mol, better still from 400 to 1200 g/mol and even better still from 400 to 1000 g/mol.

According to one embodiment of the invention, the precursor for the antifog coating comprises more than 80% by weight, preferably more than 90% by weight, of organosilane compound according to the invention, with respect to the total weight of the precursor for the antifog coating. According to one embodiment, the precursor for an antifog coating consists of a layer of said organosilane compound.

Preferably, the precursor for an antifog coating of the invention comprises less than 5% by weight of metal oxide or metalloid oxide (for example silica or alumina), with respect to the total weight of the coating, and better still does not comprise it. When the organosilane compound used for the formation of the antifog coating is deposited under vacuum, preferably no metal oxide is coevaporated with it, according to the technique for the coevaporation of at least one organic compound and of at least one inorganic compound described in the application EP 1 324 078.

The precursor for an antifog coating of the invention preferably has a static contact angle with water of strictly greater than 10° and of strictly less than 50°, preferably less than or equal to 45°, better still ≤40°, even better still ≤30° and ideally ≤25°. This contact angle preferably ranges from 15° to 40°, better still from 20° to 30°. Its surface energy is preferably at least 15 mJ/m$^2$, better still at least 25 mJ/m$^2$. These different values are satisfied by the precursor for an antifog coating initially deposited (including an excess of compound A) and/or the precursor for an antifog coating resulting from the removal of the temporary layer of the invention, preferably by both.

The deposition of the compound A at the surface of the coating comprising silanol groups can be carried out according to usual techniques, preferably by gas-phase or liquid-phase deposition, ideally gas-phase deposition, by vacuum evaporation. The compound A can be dissolved beforehand in a solvent before being evaporated, in order to exert better control over the rate of evaporation and of deposition.

According to one of the embodiments of the invention, the precursor coating is deposited by application of a composition comprising a hydrolyzate of the compound A, in the case where the latter is an organosilane. In this case, it is recommended to apply the composition fairly rapidly after hydrolysis, typically less than 2 hours, preferably less than 1 hour, better still less than 30 minutes, after having carried out the hydrolysis (by addition of an acidic aqueous solution, typically of HCl), in order to limit the formation of siloxane prepolymers before grafting. However, it is preferable to deposit said organosilane by the gaseous route.

After the deposition of the compound A in accordance with the invention, the external part of the coating which can be removed by wiping is preferably not removed, whether by washing or by wiping, or else can be removed but only partially. This precursor coating would thus exhibit problems of adhesion to the holding pad during edging.

At least one temporary layer according to the invention is formed directly on the precursor coating for the antifog coating. Several temporary layers according to the invention based on identical or different materials can be formed on one another.

According to one embodiment, the precursor coating for the antifog coating is coated with two identical or different temporary layers which adhere to one another, each temporary layer comprising at least 50% by weight of silica, with respect to the total weight of this temporary layer.

However, it is preferable to use only a single temporary layer or two, ideally just one. The present description is written essentially from this perspective for the sake of conciseness but also applies to the case of the use of a plurality of temporary layers.

This layer comprises at least 50% by weight of silica, preferably at least 60% by weight of silica and better still at least 70% by weight of silica, with respect to the total weight of the temporary layer. It preferably comprises at least 80% by weight of silica, better still at least 90% by weight of silica and even better still at least 95% by weight of silica. According to one embodiment of the invention, the temporary layer consists of a layer of silica.

When the temporary layer does not comprise only silica, it comprises other materials which are preferably dielectric materials, such as metal oxides, preferably alumina ($Al_2O_3$).

When a temporary layer comprising a mixture of $SiO_2$ and $Al_2O_3$ is used, it preferably comprises from 1% to 10% by weight, better still from 1% to 8% by weight and even better still from 1% to 5% by weight of $Al_2O_3$, with respect to the total weight of $SiO_2+Al_2O_3$ in this layer. For example, $SiO_2$ doped with from 2% to 4% by weight of $Al_2O_3$, or $SiO_2$ doped with from 2.5% to 5% by weight of $Al_2O_3$, or $SiO_2$ doped with from 4% to 8% by weight of $Al_2O_3$, can be employed. Commercially available $SiO_2/Al_2O_3$ mixtures can be used, such as Lima® 4 or Lima® 8, sold by Umicore Materials AG, or the substance L5®, sold by Merck KGaA.

The material of the temporary layer according to the invention does not detrimentally affect the surface properties of the precursor coating for the antifog coating, and is capable of being removed during a subsequent operation after the edging stage. The material of this temporary layer also has a satisfactory cohesive force, so that the withdrawal of the temporary layer is carried out without leaving residues at the surface of the precursor coating for the antifog coating.

Generally, the temporary layer should have a sufficient thickness to prevent any subsequent detrimental change in the properties of the precursor coating for the antifog coating during the various stages of treatment of the article. Its thickness is preferably ≥5 nm, better still ≥10 nm and preferably ≤200 nm, better still ≤100 nm and even better still ≤50 nm. It typically ranges from 5 to 200 nm, preferably from 10 to 100 nm.

The temporary layer preferably exhibits a static contact angle with water of less than 50°, better still of less than 40° and even better still of less than 30°. Its surface energy is preferably at least 15 mJ/m², better still at least 25 mJ/m².

The temporary layer can be deposited by any suitable conventional process, in the vapour phase (vacuum deposition) or in the liquid phase, for example by spraying, spin coating or dipping.

The temporary layer is preferably deposited by the gaseous route, in particular by vacuum evaporation. This is because the deposition by vacuum treatment makes possible precise control of the thickness of the temporary layer and minimizes the dispersions, which is not necessarily the case with the other technical solutions available. In addition, this vacuum treatment exhibits the advantage of being able to be directly incorporated in the industrial process for the treatment of the optical articles, in particular when the latter are equipped with an antireflective coating.

Preferably, the deposition of the temporary layer is carried out in a vacuum chamber without supplying additional gas during the deposition stage. This deposition technique, which it is preferable to avoid, known as gas-pressure-regulated deposition, consists in introducing an additional "passive" gas, such as, without limitation, argon, oxygen or their mixtures, into the vacuum deposition chamber during the deposition of a layer. This pressure-regulated deposition is different from ion assisted deposition.

The temporary layer is formed so that it at least partially covers the precursor coating for the antifog coating.

The deposition can be carried out over the entire surface of the face of the optical article intended to receive the adhesive holding pad/block system or over a portion of the latter. In particular, the temporary layer can be applied only to the region intended to receive the contact of the holding pad, for example the central part of the article.

The temporary layer can uniformly cover the targeted surface, that is to say exhibit a continuous structure, but it can also exhibit a non-continuous structure, for example take the form of a network. This type of structure can be obtained by application of a mask at the surface of the article, in order to limit the deposition of the temporary layer to the desired region.

The region covered by the temporary layer is such that the contact surface between this layer and the holding pad is sufficient to ensure the adhesion of the lens to the pad. Generally, the temporary layer covers at least 15%, preferably at least 20%, better still at least 30%, even better still at least 40% and preferably all of the surface of the face of the optical article to which the pad will adhere, that is to say, when it is a lens, its convex face.

Subsequent to the deposition of the temporary layer according to the invention, an optical article suitable for edging is obtained. This temporary layer preferably constitutes the external layer of the optical article, that is to say, its layer which is in contact with the air. However, it is possible to deposit, on the latter, other temporary films or layers which make it possible to edge the optical article, in particular a film of polymeric nature, for example formed from a latex, conferring, on the article, a surface energy preferably greater than or equal to 15 mJ/m².

The temporary layer used in the present invention exhibits numerous advantages. It does not affect the transparency of the optical article, so that it remains possible to carry out, on the article coated with this temporary layer, conventional measurements of power by a frontofocometer. It can be subjected to marking by means of various marking inks commonly used by a person skilled in the art for progressive lenses. It also has a mechanical strength generally sufficient to withstand the rubbing actions generated during the storage and the handling of the articles, in particular when the articles are ophthalmic lenses stored and distributed in paper envelopes.

It is possible to deposit a film on the surface of the temporary layer adhering by the electrostatic route, as described in the patent application EP 1 664 906.

The invention also relates to a process for edging an optical article as defined above, comprising:
  attaching the optical article to a holding device by means of an adhesive pad which adheres to the surface of the optical article (blocking step);
  mounting the holding device, to which the optical article adheres via the adhesive pad, in an edging device;
  edging the optical article by machining the periphery of the optical article; and
  after recovering the optical article (deblocking step), removing the temporary layer.

In the case where the optical article is a spectacle lens, the edging stage makes it possible to shape it to the dimensions and to the shape of a frame.

The temporary layer, or overlayer, makes it possible to directly apply the holding pad to the optical article and to hold it firmly during the edging operation, on the one hand due to its good adhesion to the precursor coating for the antifog coating and, on the other hand, by improving the normal and tangential adhesion of the pad at the surface of the article. For this reason, it avoids the phenomena of slipping and offsetting, and also the phenomenon of deblocking, and makes it possible to carry out a reliable edging.

In addition, it makes it possible to hold the article very well after the edging. This is because, after the main edging operation on the optical article, it may be desired to carry out a restart of the edging operation and/or a drilling operation, the drilled region acting, for example, as point of attachment to a spectacle frame side piece, in the case of a spectacle lens. For these latter stages, described in particular in the application WO 2009/071818, and especially for the drilling of the lens, it is essential for the block/adhesive holding pad assembly to remain in position on the surface of the article as it constitutes a reference point which makes it possible to position the drills for the drilling of the holes.

The blocking and deblocking stages and the holding systems which can be used during this process, which are conventional for a person skilled in the art, are described in more detail in the applications EP 1 392 613 and WO 2010/055261.

The edging process according to the invention provides optical articles which have undergone a maximum offset of 2° and optimally of less than or equal to 1°.

The edging stage can optionally be followed by a restart of the edging stage and/or by a drilling stage, before the temporary layer is removed.

The temporary layer according to the invention exhibits the advantage of being able to be very easily removed after the edging.

The stage of removal of this layer can be carried out either in a liquid medium, or by wiping, in particular dry wiping, or also by a combined use of these two means. This stage can be chosen from the abovementioned washing and wiping stages. Other methods for removal in a liquid medium are described in particular in the application WO 03/057641. Wiping by means of a cloth or rag is the preferred removal technique.

After removal of the temporary layer, which also results in the removal of the surplus of the compound A deposited, that is to say of the external part of the precursor coating for the antifog coating which can be removed by wiping, only the internal part of the precursor coating for the antifog coating comprising the compound A actually grafted remains at the surface of the coating comprising, at its surface, silanol groups. The ungrafted molecules are thus removed.

The thickness of the precursor coating for the antifog coating remaining after this removal stage is preferably less than or equal to 5 nm, better still less than or equal to 3 nm. The compound A deposited at the surface of the optical article thus preferably forms a monomolecular or virtually monomolecular layer.

This process can furthermore comprise an additional stage of deposition of a film of a liquid solution comprising at least one surfactant at the surface of the precursor coating for the antifog coating obtained after the removal of the temporary layer and of the external part of the precursor coating for the antifog coating which can be removed by wiping, thus giving access to a temporary antifog coating.

An optical article having excellent antifog properties is thus recovered, which means that the temporary layer according to the invention does not exert any negative effect on the antifog properties of the article. Neither does it affect the durability of the properties of the antifog coating.

This solution provides the lenses with temporary protection against fog by creating a uniform layer at their surface which helps in dispersing the water droplets over the surface of the lens so that they do not form visible fog.

The application of the surfactant solution can be carried out by any known technique, in particular by dipping, spin coating or spraying.

The surfactant solution is preferably applied by deposition of a drop of this solution at the surface of the precursor for the antifog coating and by then spreading it so as to cover preferably all of said precursor coating.

The surfactant solution applied is generally an aqueous solution, preferably comprising from 0.5% to 10% by weight, better still from 2% to 8% by weight, of surfactant.

A great variety of surfactants can be employed. These can be ionic (cationic, anionic or amphoteric) or nonionic, preferably nonionic or anionic. However, a mixture of surfactants belonging to these different categories can be envisaged. Preferably, use is made of a surface-active agent comprising poly(oxyalkylene) groups.

Use is advantageously made of a commercial cleaning solution comprising a surfactant, available in the spray or towelette form. A commercially available surfactant solution for conferring an antifog property is the Clarity Defog It® solution from Nanofilm.

The antifog coating of the invention preferably exhibits a static contact angle with water of less than or equal to 10°, better still of less than or equal to 5°.

The invention also relates to a process for the preparation of an optical article, preferably an ophthalmic lens, as defined above, comprising:
  a) providing a substrate, at least one of the main surfaces of which is coated with a coating comprising, at its surface, silanol groups,
  b) depositing on said coating, preferably by vacuum evaporation, at least one compound A having a polyoxyalkylene group and at least one group capable of establishing a covalent bond with a silanol group, so as to obtain a coating, which is the precursor for an antifog coating, comprising an internal part, in which said compound A is grafted to the coating comprising, at its surface, silanol groups, and an external part, which can be removed by washing and/or wiping,
  c) depositing on the coating, which is the precursor for the antifog coating, preferably by vacuum evaporation, at least one temporary layer comprising at least 50% by weight of silica, with respect to the total weight of the temporary layer.

The following examples illustrate the invention in more detail but without implied limitation. Unless otherwise indicated, all the thicknesses appearing in the present patent application are measured physical thicknesses.

EXAMPLES

1. Materials and Optical Articles Used

The silica is used in the form of granules supplied by Optron Inc. The mixtures of silica and alumina were supplied by Umicore and Merck KGaA. The organosilane compound used in the examples to form the precursor for the antifog coating is 2-[methoxy(polyethyleneoxy)propyl]trimethoxysilane having from 6 to 9 ethylene oxide units (examples 1-4, 6, 7), of formula (III) and with a molar mass of 450-600 g/mol (CAS No.: 65994-07-2, Ref: SIM6492.7, supplied by Gelest Inc.).

The vacuum evaporation device which makes it possible to deposit the different layers (antireflective, precursor coating for the antifog coating, temporary layer) is a Satis 1200 DLF device (start-up pressure, at which the process will start: $3.5 \times 10^{-3}$ Pa).

The lenses used in the examples according to the invention comprise a lens substrate made of bisphenol A polycarbonate (correction −8.00 diopters, +2.00 cylinder) comprising, on each of its faces, a polyurethane impact-resistant primer with a thickness of the order of 1 micron, itself coated with an abrasion-resistant coating with a thickness of the order of 3 microns by depositing and curing a composition as defined in example 3 of the patent EP 614 957, in its turn coated with an antireflective coating comprising five layers $ZrO_2/SiO_2/ZrO_2/ITO/SiO_2$ deposited on the abrasion-resistant coating by vacuum evaporation of the materials in the order in which they were mentioned (respective thicknesses of the layers: 29, 23, 68, 6.5 and 85 nm, respective deposition rates: 0.32, 0.7, 0.32, 0.13, 1.05 nm/s). The $ZrO_2$ layers are deposited with introduction of passive $O_2$ ($6.10^{-3}$ Pa) without ion assistance. The ITO layer is deposited under ion assistance of oxygen ions (2 A, 120 V), without adding passive $O_2$. An ITO layer is an electrically conducting layer of indium oxide doped with tin ($In_2O_3$:Sn).

Before the deposition of the antireflective coating, the lenses comprising the abrasion-resistant coating were subjected to a surface activation (IPC) treatment, which consists in carrying out an ion bombardment with argon ions, under vacuum, at a pressure typically of $3.5 \times 10^{-5}$ mbar (1 minute, 3 A, 150 V).

In the examples, the antireflective coating is not subjected to any activation treatment before the deposition of the precursor for the antifog coating.

2. Vapor-Phase Deposition of the Precursor for the Antifog Coating

The deposition was carried out on the antireflective coating of the lenses by vacuum evaporation using a Joule-effect heat source. 150 µl of siloxane compound of formula (III) were poured into a copper dish and this dish was deposited on a heating support made of conducting tantalum. The evaporation pressure of the siloxane compound of formula (III) generally varied from $5.10^{-4}$ to $8.10^{-4}$ Pa (deposition rate: 0.3 nm/s). A layer with a thickness of 9 to 15 nm according to the tests (including the surplus of siloxane compound), having a static contact angle with water of 13°, was obtained.

3. Deposition of the Temporary Layers

Temporary layers in accordance with the invention or comparative layers, with a thickness of 7, 12, 24 or 48 nm, were formed on the precursor coatings for the antifog coatings described above by vacuum evaporation in a vacuum chamber (deposition rate: 0.7 nm/s, P=$3.10^{-3}$ Pa, without contribution of passive gas or ion assistance. Ophthalmic lenses exhibiting a generally bluish appearance (which will disappear after wiping and/or washing) are obtained. Other colors are possible according to the thickness and the refractive index of the temporary layer. The temporary layers in accordance with the invention have static contact angles with water ranging from 22 to 23°.

The performance of the articles thus prepared was evaluated by subjecting them to the four tests described in the following section, one week after their preparation.

4. Evaluation of the Performance of the Articles Prepared a) Deblocking Test

The deblocking test consists in adhesively bonding a block+holding pad assembly to the convex face of a lens and in then subjecting the combination to sprinkling with faucet water (water at 25° C.) for 45 seconds, so as to reproduce the exposure to the water commonly used during the edging. The behaviour of the block+holding pad assembly on the lens is observed throughout the test. The grading system is as follows:

0=poor behaviour of the holding pad
1=good behaviour of the holding pad but holding pad easy to remove
2=good behaviour of the holding pad, holding pad difficult to remove b) Test on Removal of the Temporary Layer by Wiping The temporary layer is wiped manually using a rag of Selvith™ type with the aim of removing it and of obtaining lenses comprising, as external layer, a precursor coating for the antifog coating. The grading system is as follows:

0=temporary layer impossible to remove with dry or wet rag
1=temporary layer difficult to remove with dry or wet rag
2=temporary layer easy to remove with dry rag c) Test of Antifog Performance The lenses subjected to this test underwent beforehand the test on removal of the temporary layer described in §b). The solution Clarity® Defog It, comprising surfactants (polyethylene glycols, in solution in isopropanol), sold by Nanofilm, was subsequently applied, just once, to the surface of these lenses.

The lenses were subsequently placed in an environment regulated in temperature (20-25° C.) and at a humidity of 50% for 24 hours.

The lenses are then placed for 15 seconds above a heated receptacle containing water at 55° C. Immediately after, a scale of visual acuity located at 5 m is observed through the lens tested. The observer evaluates the visual acuity (in transmission) according to the following criteria:

2=No fogging, no visual distortion (visual acuity=$10/10^{th}$)
1=Fogging and/or visual distortion, making possible a visual acuity>$6/10^{th}$
0=Fogging and/or visual distortion, making possible a visual acuity<$6/10^{th}$ In practical terms, in order to obtain the grade 0 or 1, a wearer having 10/10 vision and having the lens placed in front of his eye, has to be capable of distinguishing the orientation of the letters "E" on the $6/10$ line of the Snellen Optotype chart placed at 5 meters (Armaignac scale Tridents, ref. T6, available from Fax International).

This test makes it possible to simulate the conditions of ordinary life where a wearer places his face above his tea, coffee or a saucepan of boiling water.

d) Edging Test

The edging test, carried out on an Essilor Kappa grinder, and also the protocol for measuring the offsetting undergone by the lenses during this operation, are described in detail in the application WO 2009/071818. During this test, the adhesive holding pad employed (Leap II with a diameter of 24 mm, GAM200 from 3M) is directly in contact with the temporary layer. A lens is regarded as passing the edging test if it exhibits an offsetting of 2° or less.

5. Results a) Study of the Influence of the Nature of the Materials Making Up the Temporary Layer Table 1 shows that the temporary layers in accordance with the invention, that is to say based on silica or on a mixture of silica and alumina within the limit of 8% by weight, lead to satisfactory results. The lenses of examples 1-4 have a temporary layer which makes it possible to carry out the edging under good conditions, which it is possible to remove without difficulty and which provides, after removal of this layer, a lens having the expected antifog performance.

The results are satisfactory, whether or not the temporary layer is evaporated with contribution of passive oxygen during the evaporation.

In addition, it has been found that materials, such as alumina or tin oxide, when they are used pure, as temporary layer, are harmful to the antifog performance of the lens, which might be explained by the precursor for an antifog coating being contaminated or torn off during the removal of the temporary layer. The alumina furthermore constitutes a temporary layer which is difficult to remove. It should be noted that the poor results obtained for some lenses during the test of antifog performance can be explained by the fact that the temporary layer has not been completely removed.

Other layers not suitable for use as temporary layer according to the invention are layers composed of chromium, ITO and $TiO_2$.

The thickness of the temporary layer is a parameter having a limited influence. In some cases, it is found that the increase in the thickness of the temporary layer slightly decreases the antifog, removal or deblocking grade. The nature of the material forming the temporary layer remains the most important parameter.

It should be noted that, after the removal of the temporary layer, the precursor coating for the antifog coating has a static contact angle with water of the order of 35-37° (examples 1-4).

As regards the edging test (carried out on lenses having a precursor for an antifog coating with a thickness of 12 nm and a temporary layer of $SiO_2/Al_2O_3$ L5® with a thickness of 7 nm), the lenses according to the invention do not undergo any offsetting. The blocks become detached with difficulty from the adhesive which, for its part, remains bonded to the convex surface of the lens. In view of the good behaviour of the pad on conclusion of the edging, these lenses are capable of undergoing a restart of the edging operation or a drilling operation. It has been confirmed that lenses not comprising any temporary layer failed the edging test.

b) Study of the Influence of the Thickness of the Precursor Coating for the Antifog Coating Table 2 shows that modifying the thickness of the precursor for the antifog coating can make it possible to adjust the performance of the optical article. Thus, an increase in the thickness of the precursor coating for the antifog coating

TABLE 1

(thickness of the precursor coating for the antifog coating: 12 nm)

| Example | Temporary layer | Temporary layer thickness (nm) | Deblocking grade | Removal grade | Antifog grade |
|---|---|---|---|---|---|
| 1 | $SiO_2$ | 12 | 2 | 2 | 2 |
|   |   | 24 |   |   |   |
|   |   | 48 |   |   |   |
| 2 | $SiO_2$ (*) | 12 | 1 | 2 | 2 |
|   |   | 24 |   |   |   |
|   |   | 48 |   | 1 | 1 |
| C1 | $ZrO_2$ (*) | 12 | 0 | 2 | 1 |
|   |   | 24 |   |   |   |
|   |   | 48 |   |   |   |
| 3 | $SiO_2/Al_2O_3$ (**) | 24 | 2 | 2 | 2 |
| 4 | $SiO_2/Al_2O_3$ (***) | 12 | 2 | 2 | 2 |
|   |   | 24 |   |   |   |
|   |   | 48 | 1 |   |   |
| C2 | $SnO_2$ | 12 | 2 | 2 | 0 |
|   |   | 24 |   |   |   |
|   |   | 48 |   |   |   |
| C3 | $Al_2O_3$ | 12 | 2 | 1 | 0 |
|   |   | 24 |   | 0 |   |
|   |   | 48 |   |   | 1 |

(*): Addition of oxygen during the deposition of the temporary layer, generating a porous layer.
(**): Lima ® 8 from Umicore, comprising from 4% to 8% by weight of alumina.
(***): L5 ® from Merck KGaA, comprising from 2.5% to 5% by weight of alumina.

It has been confirmed that the performance in terms of deblocking and removal and the antifog performance of the lenses of examples 1 to 4 were retained at least one month after their preparation. In order to work under optimum conditions, it is recommended to edge the lenses equipped with a temporary layer according to the invention within a period of one month. Beyond an excessively long time, the temporary layer according to the invention becomes slightly more difficult to remove, without this, however, being reflected by an inferior performance during the deblocking test and the test of evaluation of antifog performance.

It has also been found that the rate of evaporation of the precursor material for the temporary layer had little influence on the performance of the lenses prepared.

improves the ease of removal of the temporary layer and improves the antifog performance, but reduces the aptitude for edging.

However, the nature of the material forming the temporary layer remains the most important parameter.

It is thus possible to optimize the thickness of the temporary layer comprising, in accordance with the invention, at least 50% by weight of silica, and the thickness of a precursor for an antifog coating deposited in excess, so as to arrive simultaneously at a product which can be edged in complete safety, which has a good antifog performance and which has a temporary layer facilitating the edging which is easy to remove.

TABLE 2

| Example | Temporary layer (thickness: 24 nm) | Antifog precursor thickness (nm) | Deblocking grade | Removal grade | Antifog grade |
|---|---|---|---|---|---|
| 5 | SiO$_2$ | 9 | 2 | 1 | 1 |
|   |   | 12 |   | 2 | 2 |
|   |   | 15 | 1 |   |   |
| 6 | SiO$_2$/Al$_2$O$_3$ (***) | 9 | 2 | 1 | 2 |
|   |   | 12 |   | 2 |   |
|   |   | 15 |   |   |   |

(***): Substance L5 ® from Merck KGaA, comprising from 2.5% to 5% by weight of alumina.

b) Study of the Influence of the Superimposition of Two Temporary Layers According to the Invention Table 3 shows that it is possible to stack two temporary layers in accordance with the invention, the thicknesses of which have not been optimized, in order to produce a temporary bilayer leading to satisfactory results during the three tests carried out.

TABLE 3

(thickness of the precursor coating for the antifog coating: 12 nm)

| Example | Temporary layer (internal//external) | Temporary layer thickness (nm) | Deblocking grade | Removal grade | Antifog grade |
|---|---|---|---|---|---|
| 7 | SiO$_2$//SiO$_2$/Al$_2$O$_3$ –/– (***) | 12//12 | 1 | 2 | 2 |
| 8 | SiO$_2$/Al$_2$O$_3$ –/– (***)//SiO$_2$ | 12//12 | 2 | 2 | 2 |

(***): Substance L5 ® from Merck KGaA, comprising from 2.5% to 5% by weight of alumina.

The invention claimed is:

1. An optical article comprising a substrate, comprising:
   at least one main surface coated with a first coating comprising, at the surface, silanol groups;
   a second coating that is in direct contact with the first coating, and which is formed by deposition on the first coating, of at least one compound A comprising:
   a polyoxyalkylene group; and
   at least one group capable of establishing a covalent bond with a silanol group;
   wherein the second coating is further defined as precursor for an antifog coating and comprises an internal part, in which compound A is grafted to the first coating, and an external part that can be removed by washing and/or wiping; and
   at least one temporary layer comprising at least 50% by weight of silica, with respect to the total weight of the temporary layer, wherein the second coating is coated with the temporary layer.

2. The optical article of claim 1, wherein the temporary layer comprises at least 60% by weight of silica, with respect to the total weight of the temporary layer.

3. The optical article of claim 2, wherein the temporary layer comprises at least 70% by weight of silica, with respect to the total weight of the temporary layer.

4. The optical article of claim 1, wherein the temporary layer is the external layer of the optical article, in contact with the air.

5. The optical article of claim 1, wherein the precursor coating for the antifog coating has a thickness ranging from 3 to 100 nm.

6. The optical article of claim 1, wherein the compound A is an organosilane and the group capable of establishing a covalent bond with a silanol group is a silicon atom carrying at least one hydrolyzable group.

7. The optical article of claim 6, wherein the organosilane compound is a compound of formula:

$$R^1Y_mSi(X)_{3-m} \quad (I)$$

wherein:
   each Y group is independently a monovalent organic group bonded to the silicon via a carbon atom;
   each X group is independently a hydrolyzable group or hydroxyl group;
   $R^1$ is a group comprising a polyoxyalkylene functional group; and
   m is an integer equal to 0, 1 or 2.

8. The optical article of claim 1, wherein the temporary layer comprises from 1% to 10% by weight of alumina, with respect to the total weight of the temporary layer.

9. The optical article of claim 1, wherein the temporary layer consists of a layer of silica.

10. The optical article of claim 1, wherein the temporary layer has a thickness ranging from 5 to 200 nm.

11. The optical article of claim 1, wherein the second coating that is a precursor to an antifog coating has a surface energy of greater than or equal to 15 mJ/m$^2$.

12. The optical article of claim 1, wherein the coating comprising silanol groups at its surface is an antireflective coating or a silica-based layer deposited on an abrasion-resistant coating.

13. The optical article of claim 1, further defined as an optical lens.

14. The optical article of claim 13, wherein the optical lens is an ophthalmic lens.

15. The optical article of claim 1, wherein the second coating is coated with only one temporary layer comprising at least 50% by weight of silica, with respect to the total weight of the temporary layer.

16. The optical article of claim 1, wherein the second coating is coated with two midentical or different temporary layers which adhere to one another, each temporary layer comprising at least 50% by weight of silica, with respect to the total weight of the temporary layer.

17. A process for edging an optical article of claim 1, comprising:
   attaching the optical article to a holding device with an adhesive pad which adheres to the surface of the optical article;

mounting the holding device, to which the optical article adheres via the adhesive pad, in an edging device;

edging the optical article by machining the periphery of the optical article; and after recovering the optical article, removing the temporary layer.

18. The process of claim 17, wherein the thickness of the precursor coating for the antifog coating, after the removal of the temporary layer, is less than or equal to 5 nm.

19. A process for the preparation of an optical article of claim 1, comprising:

providing a substrate, at least one of the main surfaces of which is coated with a first coating comprising, at its surface, silanol groups;

depositing on the first coating, a second coating that is in direct contact with the first coating comprising at least one compound A having a polyoxyalkylene group and at least one group capable of establishing a covalent bond with a silanol group, wherein the second coating is further defined as precursor for an antifog coating and comprises an internal part, in which compound A is grafted to the first coating, and an external part that can be removed by washing and/or wiping; and depositing on the second coating, at least one temporary layer comprising at least 50% by weight of silica, with respect to the total weight of the temporary layer, wherein the second coating is coated with the temporary layer.

20. The method of claim 19, wherein at least one or both of the second coating and the temporary coating are deposited by vacuum deposition.

* * * * *

UNITED STATES PATENT AND TRADEMARK OFFICE
CERTIFICATE OF CORRECTION

PATENT NO. : 9,435,914 B2  
APPLICATION NO. : 14/117251  
DATED : September 6, 2016  
INVENTOR(S) : Francis Henky and Alexis Theoden Page 1 of 1

It is certified that error appears in the above-identified patent and that said Letters Patent is hereby corrected as shown below:

On the Title Page

Item (73), Line 1:
Delete "ESSILOR INTERNATIONAL" and replace with -- ESSILOR INTERNATIONAL (COMPAGNIE GENERALE D'OPTIQUE) --.

In the Claims

Claim 16, Column 22, Line 59:
Delete "midentical" and replace with -- identical --.

Signed and Sealed this  
Seventh Day of February, 2017

Michelle K. Lee  
*Director of the United States Patent and Trademark Office*